Aug. 11, 1925.
W. R. TOWNLEY
AUTOMOBILE LOCK
Filed June 24, 1920
1,549,393
2 Sheets-Sheet 1
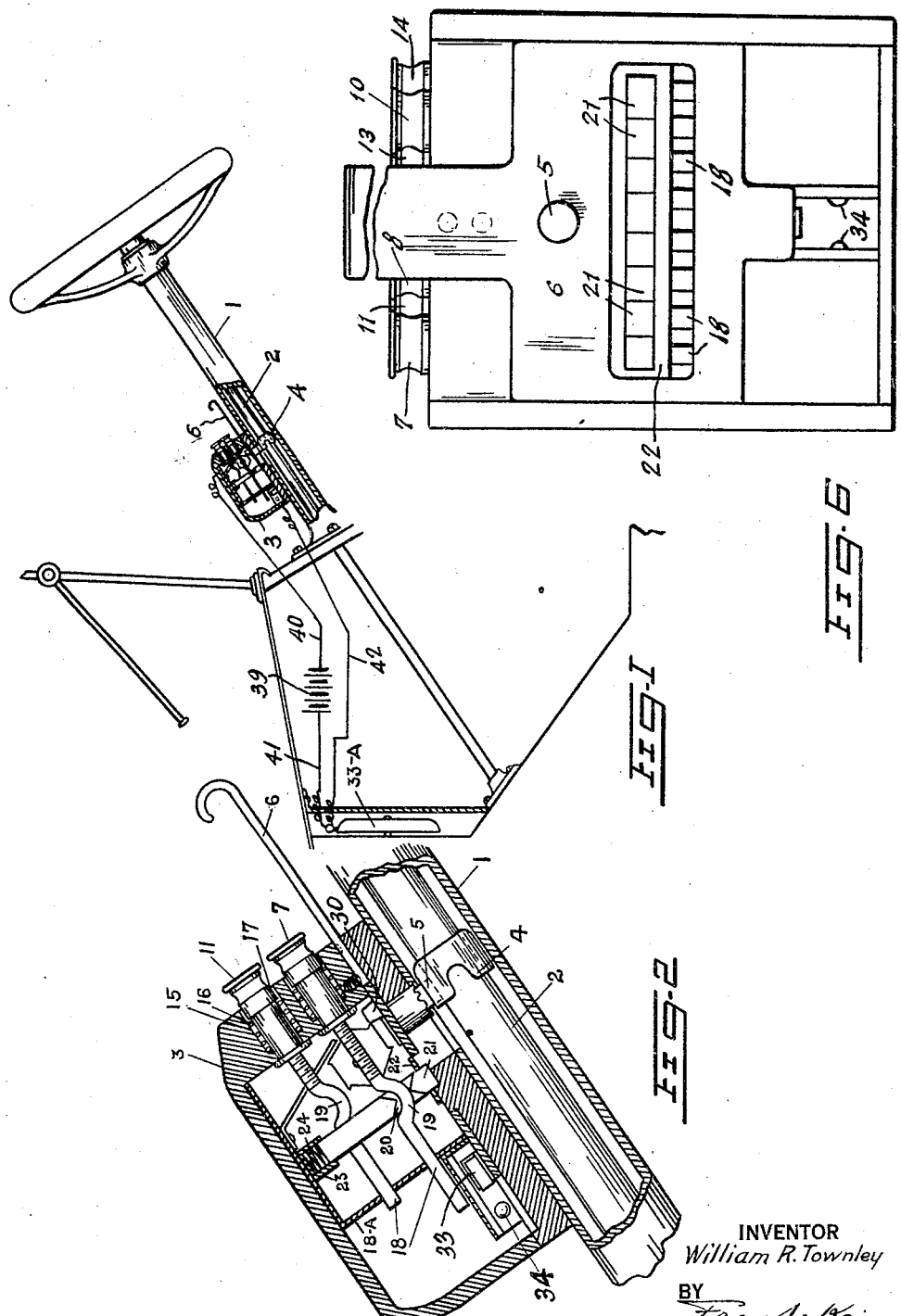
INVENTOR
William R. Townley
BY
Frank Keipe,
ATTORNEY Aug. 11, 1925. 1,549,393
W. R. TOWNLEY
AUTOMOBILE LOCK
Filed June 24, 1920 2 Sheets-Sheet 2
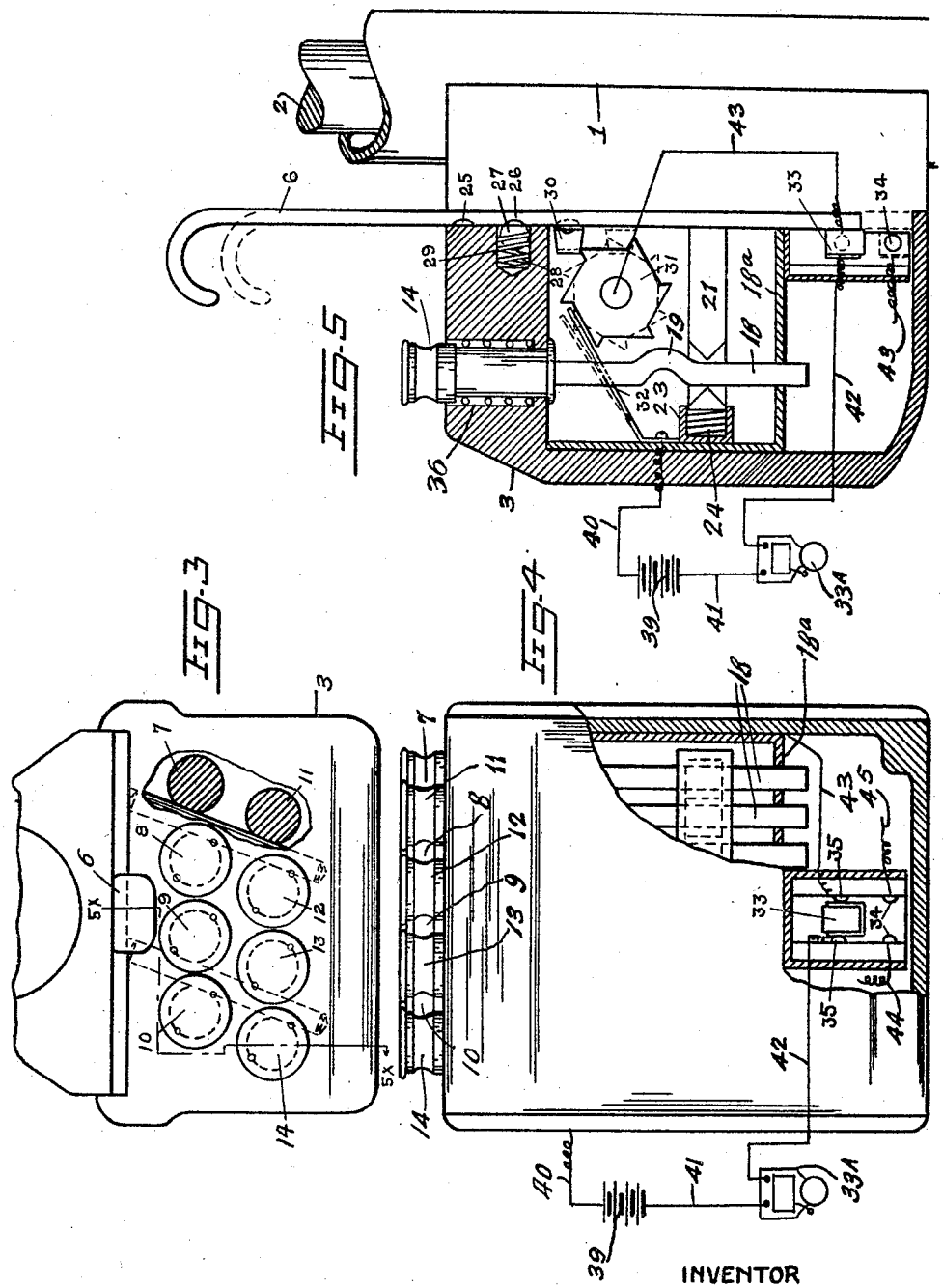
INVENTOR
William R. Townley
BY Frank Kelpes.
ATTORNEY Patented Aug. 11, 1925.

1,549,393

UNITED STATES PATENT OFFICE.

WILLIAM R. TOWNLEY, OF ROCHESTER, NEW YORK, ASSIGNOR, BY MESNE ASSIGNMENTS, TO ROCHESTER LOCK CORPORATION, OF ROCHESTER, NEW YORK, A CORPORATION OF NEW YORK.

AUTOMOBILE LOCK.

Application filed June 24, 1920. Serial No. 391,537.

*To all whom it may concern:*

Be it known that I, WILLIAM R. TOWNLEY, a citizen of the United States, residing at Rochester, in the county of Monroe and State of New York, have invented certain new and useful Improvements in Automobile Locks, of which the following is a specification.

The object of this invention is to provide a new and improved lock for automobiles.

This and other objects of the invention will be fully illustrated in the drawings, described in the specification and pointed out in the claims at the end thereof.

In the drawings:

Fig. 1 is a side elevation of the steering mechanism of an automobile with the lock in place thereon, the parts being shown partly broken away or in section.

Fig. 2 is an enlarged longitudinal sectional view of the locking mechanism.

Fig. 3 is a top plan view of the lock partly broken away to better illustrate parts of the mechanism within the lock.

Fig. 4 is a front elevation of the lock, partly broken away.

Fig. 5 is a vertical section thru the lock, the section being taken on the line 5×—5× of Fig. 3 looking toward the left.

Fig. 6 is a rear elevation of the lock removed from the attaching plate and showing the latch plate.

In the drawings, like reference numerals indicate like parts.

In the drawings, reference numeral 1 represents the fixed standard of an automobile steering mechanism within which a movable steering post 2 is arranged. On the standard is provided the auto lock 3 which forms the subject matter of this invention. Fastened rigidly to the steering post 2 is a locking collar 4. Mounted on the auto lock is a lock stud 5 adapted to be moved into engagement with suitable recesses in the collar 4, to prevent the turning of the collar, and this in turn will prevent the turning of the steering post 2 and the steering wheel. The movement of the bolt 5 is secured thru the latch plate 6, on which it is mounted, and with which it is adapted to move to the limit shown in Fig. 2, it being understood that in Fig. 2 the latch plate, the stud 5 and the bolts 21 are shown in locking position. The latch plate is adapted to be moved downwardly or inwardly from the position shown in Fig. 2, carrying the stud 5 with it and out of engagement with the collar 4, permitting the rotation of said collar. While the latch plate 6 is in the raised or uppermost position shown in Fig. 2, it is held in said position by a locking mechanism which I am now about to describe.

In the lock, eight keys, 7 to 14, inclusive, are shown arranged in two parallel rows, the keys of one row being staggered with relation to the keys in the other row. Each of these keys is movable within a counterbored opening 15 in the top wall or key plate 15 of the lock. Surrounding each key within the counterbored opening 36 receiving it, is an expansion spring 16 which has one end in engagement with a shoulder 17 on the key 11, etc., and its other end in engagement with the shoulder 37 of said counterbored opening and through the medium of which spring the key is normally held in raised position. When the key is pushed in, the spring is compressed. When the driver's fingers are removed from the keys, the springs will restore the keys to their normal position. Each key has a collar 38 at its lower end, which, when the key is in its outermost or projected position, bears against the inner surface of the top wall or key plate 15 of the lock; thus limiting the outward movement of said key.

Threaded into each key is a stem 18, the threads of the stem making a long engagement with the key for the purpose of raising and lowering the stem therein. These stems are guided at the bottom by the guide plate 18ᴬ. Below the threaded portion of each stem, it is bent to form a cam 19 thereon, which cam is adapted to engage the walls of a cam slot 20 in a sliding bolt 21, hereinafter referred to one of which is provided for each key. Each of these bolts 21 is slidably supported at one end within a slot or opening in a guide plate 22 and at its other end it is slidably supported within a channel or socket bar 23, which contains springs 24, one for each sliding bolt. These springs normally press the locking bolts against or underneath the latch plate 6, as the case may be, or, in other words, to the right, as viewed in Figs. 2 and 5.

As shown in Fig. 2, the stem 18 of the key 11 is adjusted within said key so that it assumes a raised position or shortened condition; and the stem 18 of the key 7 is so adjusted within said key 7 that it assumes a lowered position or lengthened condition. The key 11, broadly considered to include its stem 18 holds its co-acting sliding or locking bolt 21 back or to the left, while the key 7, similarly considered holds its co-acting locking bolt forward or to the right. The bolt 21 co-acting with the key 7 engages under the latch plate 6 and will prevent the downward movement thereof, and this in turn prevents the unlocking of the car, as above explained. Certain ones of the stems 18 will be in raised position, as shown for key 11, and other stems will be lowered, as shown for key 7. The keys having their stems in lowered position corresponding to key 7, must be pushed down to withdraw the bolts 21 from the latch plate, and the other keys must be left undisturbed. If any of the other keys are pushed down, their bolts will be thrown forward under the latch plate and each of such bolts thrown forward will lock the latch plate which the operator is trying to release. Any small number of the keys may be set corresponding to key 7 and when so set those keys must all be depressed at the same time to release the latch plate 6, and no others. The operator must know just what keys he should depress to release the latch plate 6, and if he depresses any other keys than those adjusted for unlocking when depressed the car will remain locked in spite of the operator's efforts to release it. In consequence of this, the lock will make it extremely difficult for a thief to unlock and steal the car.

As shown in Fig. 2, the latch plate 6 does not engage directly with the bolt 21 but has a short distance to move before making engagement, this distance being indicated by the difference between the full and dotted lines at the top of Fig. 5. The latch plate is grooved transversely in two places as indicated at 25 and 26 in Fig. 5. In the top wall or key plate 15 is provided a ball 27 pressed forward by a spring 28 in a socket 29. This ball engages with recesses 25 and 26 and will hold the latch plate 6 in one position or the other. If the latch plate is pushed down from the position shown in Figs. 2 and 5 against the locking bolts 21, its movement will be prematurely arrested and it will cause the sounding of an alarm in a manner that I will now describe.

From the foregoing it will be apparent that the latch plate 6 and the various keys provided for manipulating the sliding or locking bolts 21 are arranged parallel and this arrangement enables the operator of the automobile to more conveniently manipulate the lock, since pressure is applied with the two hands in opposite directions, and as the keys are spring elevated and naturally tend to counteract the pressure of the fingers applied thereto, such arrangement will give the operator the necessary force, without effort, to depress the selected keys with one hand while exerting pressure in the opposite direction against the latch plate with the other hand. There are, therefore, counteracting forces used for manipulating the lock, which assure convenient and easy operation of the same.

By reason of the latch plate and keys being arranged as just described, the sliding or locking bolts 21 move in planes at right angles to the planes in which said latch plate and keys are disposed, and consequently such sliding bolts or plates act as positive obstructions to the movement of the latch plate when improper keys are depressed by an unauthorized person.

Carried on the latch plate 6 is a dog 30 which engages with the teeth of a ratchet wheel 31 rotatable on or with a shaft disposed transversely within the lock above the sliding or locking bolts 21 and each complete downward movement of the latch plate will cause said dog to engage one of the teeth of said ratchet wheel and rotate the same the distance of one tooth, or one-sixth of a revolution. When the latch plate moves up, the dog 30, being made of spring metal, will slide over the next tooth of the circular series on the wheel until it passes the upper end of it, when it will resume its extended position so as to engage with said last mentioned tooth on its next downward movement.

As the ratchet wheel is turned by the latch plate, one of the teeth of said wheel engages with a spring contact plate 32 extending from one of the walls of the lock over said ratchet wheel and closes an electric circuit for the purpose of ringing a bell 33ᴬ. If the latch plate makes a full stroke, the tooth of the ratchet wheel adjacent said contact plate will only engage said plate for an instant and the alarm will be a short one, but if the latch plate is arrested by one or more of the bolts 21, due to an attempt being made to unlock the latch plate without manipulating the proper keys, an electric circuit will be established and the contact maintained until the proper keys have been depressed and the latch plate has been moved to the end of its stroke, during all of which time the alarm will continue to ring.

The latch plate 6 extends to the bottom of the lock when unlocked and carries an elongated contact 33, which engages with a pair of contacts 34 to close the ignition circuit when the latch plate is at its lowermost or unlocked position, and engages with a pair of contacts 35 to close the bell circuit when it is in its raised position, or when the automobile is locked.

In Fig. 1 of the drawings, the bell 33^A is shown positioned in front of the dashboard of the car or automobile, but it may have any other desired location. This bell is shown diagrammatically with its circuit wires in Figs. 3 and 4. In said figures, 39 designates the battery, from one pole of which a wire 40 may be led to the spring contact plate 32. From the other pole of the battery a wire 41 may be led to the bell 33^A, and from said bell a wire 42 may be led to one of the pair of contacts 35. From the other of said pair of contacts, a wire 43 may be led to the ratchet wheel 31, and as the contact 33 on the latch plate is elongated, this contact will be in engagement with the pair of contacts 35, even though the latch plate is in its uppermost or fully locked position; but it will be noted that when the latch plate is in this position, the circuit in which said bell 33^A is included is broken between said ratchet wheel and the spring contact plate 32. However, upon depressing the latch plate with a view of unlocking the lock, the dog 30 on said plate will cause rotation of the ratchet wheel and bring the tooth underlying said contact plate in physical engagement with the latter and thus close the circuit so as to cause the bell 33^A to be rung. This alarm is only momentarily given when the parts of the lock permit the latch plate 6 to be moved to its fully depressed or unlocked position; but when improper keys are manipulated by an unauthorized person, the latch plate 6, in the attempt to actuate the same, will only be partially depressed or lowered and contact will then be maintained between the contact plate 32 and the ratchet wheel 31 so that the alarm continues to ring until the proper keys in the predetermined combination are manipulated so as to allow full depression of the latch plate. This, however, can only be done by one familiar with the combination to which the lock is set.

It will be noticed from Figs. 4 and 5, that when the latch plate is fully depressed, the contact 33 will be moved out of engagement with the pair of contacts 35, and at such times, the ratchet wheel will have been moved a distance sufficient to position the next tooth thereon underneath the contact plate 32 without being in physical contact therewith. The tooth of the ratchet wheel previously in contact with said contact plate will have moved beyond the end of said plate and completely out of engagement therewith. From the description of the operation of said ratchet wheel and contact plate, it will be apparent that they serve as a make-and-break device.

The pair of contacts 34 have current-conducting wires 44, 45 connected thereto, and these wires form part of the ignition circuit, which may vary in various automobiles, and as these contacts are merely interposed in a common ignition circuit of an automobile, it is not considered necessary to illustrate a complete circuit in the drawings to include these contacts. It will, however, be clear that until the contact 33 of the latch plate 6 is positioned between the pair of contacts 34 and is in physical contact with both of said contacts, ignition of the spark plugs in the engine of the automobile cannot take place. Consequently, it is necessary that the latch plate 6 be fully depressed or unlocked before the automobile can be started.

From the foregoing it will be clear that the two circuits are established and broken by the movement of the latch plate and that during the movement of said plate in one direction the order of establishing said circuits is such that the alarm will first be given and when the parts of the lock are not properly actuated, complete movement of the latch plate cannot take place; and furthermore that if the parts are properly manipulated to allow complete movement of the latch plate, the ignition circuit is closed after the latch plate has momentarily established the alarm circuit.

I claim:

1. A lock having a latch plate mounted to slide therein, a series of bolts capable of engaging under said plate and arresting its motion, a separate key for moving each of said bolts, some bolts being normally in engaging position and the other bolts being out of engaging position, a ratchet wheel, a dog on the latch plate capable of engaging with the ratchet wheel and moving it a part of a step only when the latch plate is locked and capable of moving it a full step when the latch plate is released, and an electric contact engaged by a tooth of the ratchet to close a circuit when the ratchet is partially rotated.

2. A lock having a latch plate mounted to slide therein from locking to unlocking position and reversely, means engaging said plate to arrest its motion from locking to unlocking position, a ratchet wheel, means on said latch plate adapted to engage with said ratchet wheel and move the same a part of a step only when the latch plate is locked and being adapted to move said ratchet wheel a full step when said latch plate is released and moved from locked to unlocked position, and an electric contact engaged by a tooth of said ratchet wheel to close a circuit and maintain said circuit when said ratchet wheel is moved less than a full step.

3. A lock having a latch plate mounted for reciprocable movement, means adapted to engage under said latch plate and arrest its movement in one direction, means for manually actuating said engaging means, a contact element arranged for movement step by step and adapted to be actuated a full step by said latch plate when said plate is released from said engaging means and to be actuated a part of a step only when attempting to actuate said latch plate while engaged by said engaging means, and an electric contact normally in spaced relation with said contact element but adapted to be engaged and maintained in engagement with said contact element when moved a part of a step only, said ratchet wheel when moved a full step engaging said electric contact only for an instant.

4. A lock having a latch plate mounted for reciprocable movement, means to arrest the motion of said plate when at the end of its movement in one direction, manually-operated means to manipulate said arresting means, and an electric circuit including a make-and-break device, said make-and-break device, being adapted to be actuated by said latch plate.

In testimony whereof I affix my signature.

WILLIAM R. TOWNLEY.